United States Patent Office 3,168,576
Patented Feb. 2, 1965

3,168,576
PURIFICATION OF ALKYL PHENOL OXIDATION INHIBITORS
James L. Jezl, Swarthmore, Pa., assignor to Sun Oil Company, Philadelphia, Pa., a corporation of New Jersey
No Drawing. Filed Dec. 10, 1959, Ser. No. 858,566
9 Claims. (Cl. 260—619)

It is known in the art to prepare alkyl phenol oxidation inhibitors by the alkylation of phenols or by such alkylation in series with other reactions. For example the alkylated bisphenol type of oxidation inhibitor can be prepared by alkylation of a phenol and condensation with formaldehyde to join two phenol radicals by means of a methylene group.

In the products that are obtained by the known processes for preparation of alkyl phenol oxidation inhibitors, there are usually substituents in the benzene ring in the position ortho to the phenol group. However, the products of the processes usually contain small amounts of impurities which are phenol compounds having lesser numbers of substituents, or no substituents, in the position ortho to the phenol group. Hereafter in this specification the former type of alkylated phenol product will be referred to as alkylated phenol oxidation inhibitors, and the latter type will be referred to as alkylated phenol impurities.

The alkylated phenol impurities cause poor color stability in the alkylated phenol oxidation inhibitor. The impurities react with metals to form color bodies and therefore produce detrimental results in environments where trace amounts of metals are present, for example in olefin polymers obtained by the use of a metal-containing catalyst such as the so-called Ziegler catalyst. Various other environments as recognized in the art contain metals which produce these detrimental results by reaction with impurities in the oxidation inhibitors.

According to the present invention a novel manner is provided for removing such impurities from alkylated phenol oxidation inhibitors. This is accomplished according to the invention by contacting the oxidation inhibitors with an epoxide to react the latter selectively with the impurities, leaving the oxidation inhibitor unreacted. Generally large reductions in content of impurities, e.g., 75% or greater reduction, are obtainable in the process of the invention.

Epoxides which are known to be reactive with organic compounds containing active hydrogen atoms are generally suitable for use according to the invention. Such epoxides constitute a recognized class of organic compounds. Alkylene oxides having 2 to 6 carbon atoms, such as ethylene oxide, propylene oxide, butylene oxide, etc., are preferred but other well known types of epoxides can also be employed, e.g., epichlorohydrin, styrene oxide, phenoxy propylene oxide, etc. The epoxides which are disclosed in Patent No. 2,771,404, which issued November 20, 1956, to James L. Jezl and Abraham Schneider, are generally suitable for use according to the invention, and others may also be employed. The contacting with epoxide according to the invention is preferably performed in the presence of a catalyst for the reaction between the epoxide and the impurities. Alkaline catalysts are preferred, e.g., 5 to 40% aqueous solutions of alkali metal hydroxide. Other alkaline materials and other types of catalysts which are known for the condensation of epoxides with organic compounds having active hydrogen atoms can be employed according to the invention.

The temperature of contacting is not critical. Satisfactory results can often be obtained at room temperature though higher temperatures usually accelerate the desired reaction. Temperatures up to 200° F. or higher for example can be employed. Usually it is desirable to perform the contacting at atmospheric pressure unless elevated pressure is necessary in order to maintain materials in liquid phase at elevated contacting temperatures.

The amount of epoxide employed is preferably in the approximate range from 0.01 to 0.15 mole per mole of alkylated phenol oxidation inhibitor, though other amounts can be used in some cases. The optimum amount depends on the amount of alkylated phenol impurities in the starting material and a person skilled in the art can readily determine suitable amounts for a given starting material. Generally an excess of epoxide over the stoichiometric amount to react with impurities is desirable.

The amount of catalyst employed in cases where the use of catalyst is found desirable is preferably in the approximate range from 0.01 to 0.15 mole per mole of alkylated phonel oxidation inhibitor, though other amounts can be used in some cases. In one embodiment of the process according to the invention the alkylated phenol oxidation inhibitor is converted entirely, where this is possible, to the form of a salt of the phenol with an alkali metal, prior to the contact with epoxide. In such cases it is usually not necessary to provide any excess alkaline material as catalyst for the process.

The starting material for the process according to the invention is an alkylated phenol having a tertiary alkyl substituent in the ortho position. Preferably the starting material has a substituent in each of the ortho positions, one or both of these substituents being a tertiary alkyl hydrocarbon radical. Examples of suitable starting materials are ortho-t-amyl phenol, ortho-t-butyl phenol, 2,6-di-t-butyl phenol, corresponding cresols where the methyl group is in the para position, methylene bis-(tertiary alkyl phenols) containing two such alkyl phenol radicals, etc. Preferred starting materials for the process according to the invention include those having the following formula:

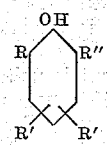

where R is a tertiary alkyl radical having 4 to 6 carbon atoms, each R' is selected from the group consisting of hydrogen and alkyl radicals having 1 to 6 carbon atoms, and R" is selected from the group consisting of tertiary alkyl radicals having 4 to 6 carbon atoms and radicals having the formula:

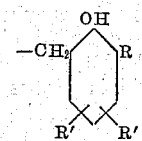

where R and R' are as previously defined.

The product of reaction between epoxide and impurities is in one embodiment allowed to remain in the alkylated phenol oxidation inhibitor product. Such reaction products usually do not exhibit the objectionable characteristics of the impurities prior to the reaction. In another embodiment the reaction products are separated from the alkylated phenol oxidation inhibitor, for example by extraction, where feasible, with a hydrocarbon or with ether from an alcoholic solution of alkali metal salts of the alkylated phenol oxidation inhibitor. In another embodiment, the reaction products are separated from the oxidation inhibitor by fractional distillation, the boiling point of the reaction products being sufficiently different from that of the unreacted oxdation inhibitor to permit such separation.

The alkylation procedure involved in the preparation of the alkylated phenol oxidation inhibitor is a conventional procedure. Typical process involves contacting a phenol with isobutylene in the presence of a sulfuric acid catalyst at a temperature of about 65° C. The procedure for condensation of phenols with formaldehyde is also conventional, and any of the known procedures can be employed.

The following examples illustrate the invention:

*Example 1*

2,6-ditertiary butyl p-cresol, previously prepared by alkylation of p-cresol with isobutylene, is contacted with propylene oxide-1,2 to selectively react the latter with impurities in the alkylated cresol. These impurities are small amounts, e.g., less than 0.1 weight percent based on alkylated cresol, of alkylated cresols other than 2,6-ditertiary butyl p-cresol, e.g., 2-tertiary butyl p-cresol, 3,6-ditertiary butyl p-cresol, etc., formed in small amount in the alkylation.

The alkylated cresol is mixed with 0.1 mole of sodium hydroxide in 20% aqueous solution, and with 0.1 mole of propylene oxide per mole of alkylated cresol, and the mixture is agitated at room temperature for one hour. The product mixture is diluted with water and acidified with sulfuric acid. The resulting aqueous salt phase is separated from the alkylated cresol phase. The alkylated cresol product has largely reduced content of alkylated cresols other than 2,6-ditertiary butyl p-cresol, such other alyklated cresols having been converted to hydroxyalkyl ethers, while 2,6-ditertiary butyl p-cresol remains unreacted.

*Example 2*

2,2′-methylene bis-(4-methyl-6-tertiary butyl phenol), previously prepared from p-cresol by alkylation with isobutylene and condensation with formaldehyde according to known procedure, is contacted with propylene oxide-1,2 to selectively react the latter with impurities in the alkylated bisphenol. These impurities are small amounts, e.g., less than 0.1 weight percent based on alkylated bisphenol, of alkylated bisphenols other than the above, e.g., 2,2′-methylene bis-(4-methyl-5-tertiary butyl phenol), formed in small amount in the alkylation and condensation.

The alkylated bisphenol is agitated with 0.1 mole of sodium hydroxide in 40% aqueous solution and 0.1 mole of propylene oxide per mole of alkylated bisphenol for one hour at room temperature. The alkylated bisphenol product is recovered in a manner similar to that in Example 1, and is found to have largely reduced content of bisphenols other than 2,2′-methylene bis-(4-methyl-6-tertiary butyl phenol).

*Example 3*

2-methyl-4,6-ditertiary butyl phenol previously prepared by alkylation of o-cresol with isobutylene by known procedure, is contacted with propylene oxide-1,2 to selectively react the latter with impurities such as 2-methyl-3,5-ditertiary butyl phenol and 2-methyl-5-tertiary butyl phenol, formed in small amounts in the alkylation.

The alkylated cresol is converted to its potassium salt by contact with an equal volume mixture of methanol and 50% aqueous potassium hydroxide (Claisen's reagent) to react one mole of alkali with the alkylated cresol. The resulting solution is agitated with 0.1 mole of propylene oxide per mole of alkylated cresol for one hour at room temperature. The solution is then agitated with an equal volume of n-pentane at room temperature for fifteen minutes to extract from the solution the products of reaction of propylene oxide with the impurities in the original alkylated cresol. The layers are then separated, and the aqueous layer is acidified with sulfuric acid to liberate the alkylated cresol, which is then separated from the aqueous layer. The alkylated cresol product has largely reduced content of alkylated cresols other than 2-methyl-4,6-ditertiary butyl phenol.

Generally high yields of alkylated phenol oxidation inhibitor, e.g., 95% or higher, are obtainable in the process of the invention, in view of the selectivity of the reaction of epoxide with alkylated phenol impurities.

The invention claimed is:

1. Process for treating alkyl phenol corresponding to the formula:

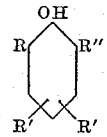

where R is a tertiary alkyl radical having 4 to 6 carbon atoms, each R′ is selected from the group consisting of hydrogen and alkyl radicals having 1 to 6 carbon atoms, and R″ is selected from the group consisting of tertiary alkyl radicals having 4 to 6 carbon atoms and radicals having the formula:

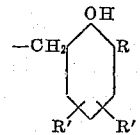

where R and R′ are as hereinabove specified and containing small amounts of impurities comprising alkylated phenols having lesser number of substitutents in ortho position; which process comprises essentially contacting said mixture in liquid phase with an epoxide in an amount sufficient to selectively react the epoxide only with said impurities at a temperature between room temperature and 200° F.

2. Process according to claim 1 wherein said alkyl phenol has two substituents in the ortho position.

3. Process according to claim 1 wherein said alkyl phenol is 2,6-ditertiary butyl p-cresol.

4. Process according to claim 1 wherein said alkyl phenol is 2,2′-methylene bis-(4-methyl-6-tertiary butyl phenol).

5. Process according to claim 1 wherein said epoxide is an alkylene oxide having 2 to 6 carbon atoms.

6. Process according to claim 1 wherein said contacting is in the presence of an alkaline catalyst.

7. Process according to claim 6 wherein said catalyst is an aqueous solution of alkali metal hydroxide.

8. Process according to claim 1 wherein the reaction products of the epoxide and said impurities are separated from the remaining alkyl phenols.

9. Process according to claim 8 wherein said reaction products are separated by extracting said products using an organic solvent selected from the group consisting of a hydrocarbon and ether from a solution of alkali metal salts of the alkyl phenols; said salt being formed by reacting said alkyl phenol with an alkali metal prior to the contact with epoxide.

References Cited in the file of this patent

UNITED STATES PATENTS

| | | |
|---|---|---|
| 2,674,619 | Lundsted | Apr. 6, 1954 |
| 2,915,559 | Horsley et al. | Dec. 1, 1959 |
| 3,013,086 | Young et al. | Dec. 12, 1961 |
| 3,020,137 | Condo | Feb. 6, 1962 |

OTHER REFERENCES

Stillson et al.: Jour. Amer. Chem. Soc., 67: 303–307 (1945) (5 pages).